United States Patent
Kloeppner

(10) Patent No.: US 7,676,617 B2
(45) Date of Patent: Mar. 9, 2010

(54) POSTED MEMORY WRITE VERIFICATION

(75) Inventor: John R. Kloeppner, Buhler, KS (US)

(73) Assignee: LSI Corporation, Milpitas, CA (US)

( * ) Notice: Subject to any disclaimer, the term of this patent is extended or adjusted under 35 U.S.C. 154(b) by 26 days.

(21) Appl. No.: 12/059,449

(22) Filed: Mar. 31, 2008

(65) Prior Publication Data

US 2009/0248942 A1    Oct. 1, 2009

(51) Int. Cl.
G06F 13/42    (2006.01)
G06F 11/00    (2006.01)

(52) U.S. Cl. .......................... 710/105; 714/48

(58) Field of Classification Search ................. 710/106, 710/110, 104, 105, 305; 714/48–52; 709/203; 370/389, 474
See application file for complete search history.

(56) References Cited

U.S. PATENT DOCUMENTS

| | | | |
|---|---|---|---|
| 6,360,335 B1 * | 3/2002 | Dawson | 714/39 |
| 7,340,555 B2 * | 3/2008 | Ashmore et al. | 710/313 |
| 7,370,129 B2 * | 5/2008 | Green et al. | 710/110 |
| 7,457,868 B1 * | 11/2008 | Guo | 709/224 |
| 2006/0187932 A1 * | 8/2006 | Barthel et al. | 370/394 |
| 2007/0214299 A1 * | 9/2007 | Lo | 710/301 |

* cited by examiner

*Primary Examiner*—Mark Rinehart
*Assistant Examiner*—Trisha Vu
(74) *Attorney, Agent, or Firm*—Luedeka, Neely & Graham, P.C.

(57) ABSTRACT

A method for verifying the proper communication of data packets from an initiator device on a PCIe data bus to a target device on the data bus. A target-specific counter on the initiator is synchronized to an initiator-specific counter on the target with the same value. The initiator writes the value of the target-specific counter into the tag field of the packet header, and also writes an identifier of the initiator into the header. Then the initiator sends the packet to the target on the PCIe data bus. Upon receipt of the packet, the target reads the identifier and checks the value against the appropriate initiator-specific counter on the target. When the value is not equal to the initiator-specific counter on the target, then it generates an error message. An additional memory write with specific data is posted from the initiator to the target. A memory read is posted of the additional memory write location from the initiator to the target. The operation of the initiator is continued when a good status and data matching the additional write data is returned from the target, and operation is halted when an error status is returned or data that does not match the additional write data.

8 Claims, 1 Drawing Sheet

POSTED MEMORY WRITE VERIFICATION

FIELD

This invention relates to the field of computerized data communications. More particularly, this invention relates to efficient error checking of computerized data communications.

BACKGROUND

As PCI Express (PCIe) bus hierarchies become more distributed, the time between when a posted memory write packet is initiated from one device (the initiator) and when it arrives at another device (the target) is becoming longer and longer. With this environment, the detection of a posted memory write packet that has become lost or dropped due to some error also takes longer and longer.

Typically, if a packet is lost between two devices, some sort of error is generated to the root complex of the PCIe hierarchy, but because of the general increase in device distribution, the generation of the error might occur only at a substantial time after the initiator device posts the packet. Once the initiator device posts the memory write packet to the PCIe hierarchy, the initiator device assumes that the packet will get to the target device error-free, since there is no packet acknowledgement built into PCIe.

The problem with this scenario is that the initiating device might generate a subsequent irreversible action that depends on the successful completion of the posted packet. Since there is no acknowledgment of success for the posted packet, the subsequent irreversible action might occur even if the posted packet is not successfully received. An example of such an irreversible action is a peripheral device that receives data from outside the PCIe hierarchy and writes the data to a non-volatile memory located across the PCIe hierarchy. When peripheral device initiates the posted memory write of data to the non-volatile memory, it might then signal back to the source of the data that the data was written to the non-volatile memory, when in reality the data is still in flight across the PCIe hierarchy—or lost altogether. In this latter situation, the detection of the error does not allow the root complex to easily identify the initiator device of the posted packet.

The PCIe bus does not have a defined way of handling issues such as these within the standards specification, so generally such errors are handled within the firmware running on the root complex of the PCIe hierarchy. One method that is used to handle such problems is as follows. When a subsequent irreversible action is dependant upon the successful completion of a posted packet, the initiator waits for an intervention from a root complex before starting the irreversible action.

For example, after the initiator posts a packet and before it starts the subsequent irreversible action, the initiator generates an interrupt to the root complex, and then stops processing until the interrupt is processed by root complex. During the length of time that the root complex takes to process the interrupt, there is an assumption (but not a guarantee) that any error that is caused by the posted packet will report to the root complex, and stop the root complex from signaling the start of the subsequent action by the initiator device.

Another method of reducing the effects of this problem is for the initiator device to generate a memory read packet to the posted memory space, after the initiator posts the memory write packet to the memory space, and before the initiator starts the irreversible action. In this manner, the posted write is guaranteed to have completed by the time the read completes, and if the posted write generates an error, the root complex can stop the initiator device from starting the subsequent irreversible action. But again, there is no guarantee that the root complex can stop the initiator device before the read completes.

The disadvantage of these traditional methods or combinations of methods is that they require intervention from the root complex before the subsequent irreversible action is initiated. Depending on the performance of the root complex, this intervention might be delayed by a significant amount of time, which will tend to impact overall system performance.

What is needed, therefore, is a system that overcomes problems such as those described above, at least in part.

SUMMARY

The above and other needs are met by a method for verifying the proper communication of posted memory write data packets from an initiator PCIe device within a PCIe hierarchy to a target PCIe device within the PCIe hierarchy. A target-specific counter on the initiator is synchronized to an initiator-specific counter on the target with the same value. The initiator writes the value of the target-specific counter into the tag field of the posted packet header, and also writes an identifier of the initiator into the header. Then the initiator sends the packet to the target on the PCIe data bus. Upon receipt of the packet, the target reads the identifier and checks the value against the appropriate initiator-specific counter on the target. When the value is not equal to the initiator-specific counter on the target, then it generates an error message. After one or more memory writes packets are sent to the target, an additional memory write and a memory read are sent from the initiator to the target to update and check the status of the initiator-specific counter. The operation of the initiator is continued when a good completion status and data matching the additional write is returned from the target, and operation is halted when an error status or data not matching the additional write is returned.

In this manner, the initiator device can detect if a posted write has successfully reached its target without the intervention of the root complex. This allows the initiator device to continue to a new operation without having to wait for the root complex to indicate the status of the posted packets. This can substantially improve system performance, by reducing the latency from operation to operation.

An additional advantage of this method is that it allows for better fault isolation when packets are lost. When a write verification error is detected, the source of the lost or dropped posted packet is indicated by the counter that has the error. As indicated above and elsewhere herein, each counter is associated with a source device. In an alternate embodiment, the system is implemented on a PCI-X bus.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

The above and other such problems are reduced by the various embodiments of the present invention, as described in exemplary manner herein. Specific examples are given herein, but it is appreciated that these are by way of example only, and not necessarily by way of limitation.

Figure 1:
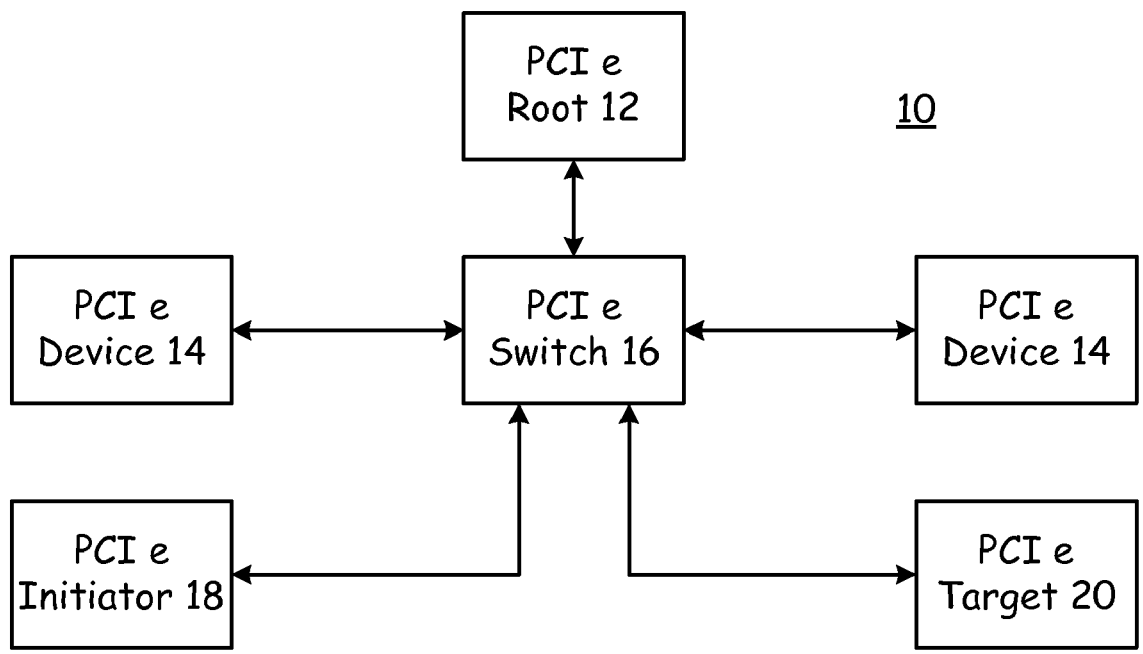
FIG. 1 is a functional block diagram of a PCIe system according to an embodiment of the present invention.

With reference now to FIG. 1, there is depicted a PCIe topology 10 with a switch 16, devices 14, and a root 12. Two of the devices 14 are designated as an initiator 18 and a target 20. According to the present invention, posted data from the PCIe initiator device 18 is verified as having been successfully delivered to the PCIe target device 20 by using a pair of sequence counters. The counter that is disposed at the initiator PCIe device 18 is called the source counter, and the counter that is disposed at the target device 20 is called the destination counter.

The source counter counts posted packets as they are transmitted from the initiator PCIe device 18, and the destination counter counts the posted packets as they are received at the target device 20. These two counters are used to detect if a packet is lost, by detecting if the two counters stay in a sequence lock-step. In one embodiment, both source and destination counters are eight bits in size and are initially set to zero at the start of day or after the counters are reset by firmware, or at some other designated time. When the counter values reach 0xffh and are incremented, they rollover to zero.

The following steps described how the counters are used to detect whether a posted packet is lost between the initiator device 18 and the target device 20.

Figure 2:
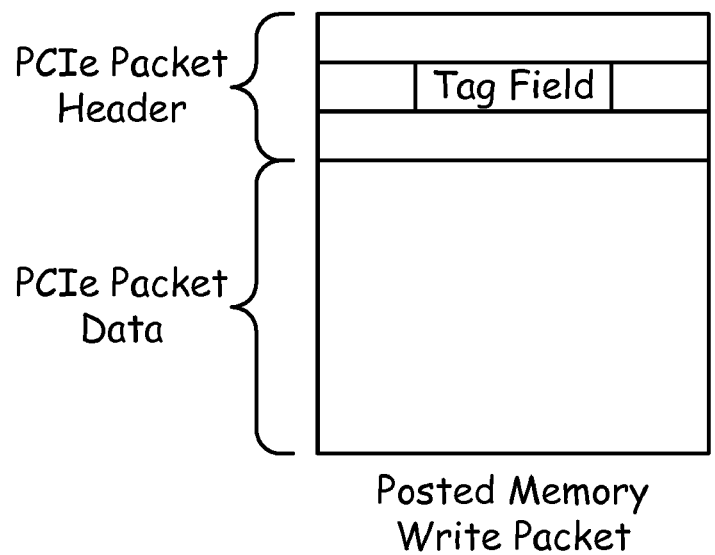
FIG. 2 is a symbolic representation of a posted memory write packet according to an embodiment of the present invention.

1. When the initiator device 18 generates the PCIe posted memory write packet, it saves the current value of the source counter in the eight bit tag field of the header for the packet, as depicted in FIG. 2.
2. The source counter is then increment by 1.
3. The posted packet is transmitted from the initiator device 18 to the target device 20 across the PCIe hierarchy 10.
4. When the target device 20 receives the posted packet, it checks the source counter value that is saved in the tag field against the present value of the destination counter in the target device 20.
   a. If the counter values are the same, then it means that the initiator 18 and the target 20 are in sequence lock-step, and no error is generated.
   b. If the counter values are different, then it means that a packet has been lost and an error is generated by the target device 20.
5. The destination counter is then incremented by 1.

In one embodiment, separate source and destination counters are used for each initiator 18 and target 20 pair in the topology 10. For example, if a PCIe hierarchy contains sixteen devices 14, and each device can act as both an initiator 18 and a target 20, then fifteen source counters and fifteen destination counters are need in each device 14. With multiple counters in each initiator 18 and target 20 device, a method is needed to determine which counter is used by a device 18 when it initiates a posted memory write packet, and which counter is used by a device 20 when it receives a posted memory write packet.

According to one embodiment of the present invention, the memory address in the header of the posted memory write packet is used by the initiator device 18 to identify the source counter that the device 18 used to replace the tag field in the header. Since the memory address range uniquely identifies the target of the packet, it is used by the initiator device 18 to determine the target device 20 for the packet, and thus what counter to use to replace the tag field in the header of the posted packet.

At the target device 20, the transaction ID (without the tag field) in the packet header is used by the device 20 to identify which counter it uses to check against the sequence count in the posted packet. The transaction ID uniquely identifies the initiator device 18 of the posted packet, which allows the target device 20 to choose the destination counter associated with that device 18.

To close the loop for the detection of drop packets, the initiator device 18 generates an additional memory write with specific data to a memory location in the target device 20 memory space and then generates a memory read of the additional memory write data of the target device 20 memory space, after the initiator device 18 posts one or more write packets to the target device 20 memory space. The purpose of the additional memory write is to provide a final verification that the source counter at initiator device 18 and destination counter at target device 20 are in sequence lock-step.

The read request fills three purposes. First, it guarantees that the posted packet data from the initiator device 18 to the target device 20 has been flushed along the path to the target device 20. Second, when the memory read arrives at the target device 20, the device 20 checks the status of all prior write verifications. If a write verification error has occurred on a prior posted write, the memory read completion packet is returned to the initiator 18 with a target abort status (bad status), otherwise the completion is returned to the initiator 18 with a good status. Third, the memory read guarantees that the additional memory write completed successfully by verifying that the data returned with the read completion matches the memory write data, or unsuccessfully by not matching the data. This allows the initiator device 18 to continue to its next operation with the ability to know whether all prior posted writes have arrived successfully at their targets, without the intervention of the root complex 12.

FEATURES OF INVENTION

The addition and use of the source and destination counter verification counters in the initiator and target devices.

The replacement of the tag field in the write posted packet with the source counter value at the initiator device and the checking of that value against the destination counter at the target device.

The use of an additional memory write after one or more memory writes provides a final verification that the source counter and destination counter are in sequence lock step.

The use of a memory read packet to check the status of a prior write verification in the target device by returning a destination abort (bad status) or completing the read successfully (good status) and to check the additional memory write was successful by returning data matching the additional memory write, or unsuccessful by returning data that does not match.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of verifying proper communication of data packets from one of a plurality of initiator devices on a data bus to one of a plurality of target devices on the data bus, the method comprising the steps of:
    synchronizing a target-specific counter selected from a plurality of target-specific counters on the initiator device where one each of the plurality of target-specific counters is associated with one each of the plurality of target devices on the data bus, and an initiator-specific counter selected from a plurality of initiator-specific counters on the target device, where one each of the plurality of initiator-specific counters is associated with one each of the plurality of initiator devices on the data bus, with a common counter value,
    with the initiator device, writing the counter value of the target-specific counter on the initiator device into a header for the packet,
    sending the packet from the initiator device to the target device on the data bus,
    upon receipt of the packet by the target device, checking the counter value written into the header of the packet with the initiator-specific counter on the target device, and
    when the counter value written into the header of the packet is not equal to the initiator-specific counter on the target device, then generating an error message with the target device.

2. The method of claim 1, wherein the communication bus is a PCIe bus.

3. The method of claim 1, wherein the communication bus is a PCI-X bus.

4. The method of claim 1, wherein the initiator device writes the counter value into a tag field of the header of the packet.

5. The method of claim 1, wherein the initiator device further indicates to the target device which initiator-specific counter the target device should check the counter value written into the header of the packet against, by writing an identifier of the initiator device into the packet header.

6. The method of claim 1, further comprising the steps of:
    Posting an additional memory write with specific data to the target,
    posting a memory read of the additional memory write location from the initiator device to the target device, and
    continuing operation of the initiator device when a completion is returned with a good status and data matching the additional memory write data from the target device to the initiator device.

7. The method of claim 1, further comprising the steps of:
    Posting an additional memory write with specific data to the target,
    posting a memory read of the additional memory write location from the initiator device to the target device, and
    halting operation of the initiator device when a completion is returned with at least one of an error status and data not matching the additional memory write data from the target device to the initiator device.

8. A method of verifying proper communication of data packets from one of a plurality of initiator devices on a PCIe data bus to one of a plurality of target devices on the data bus, the method comprising the steps of:
    synchronizing a target-specific counter selected from a plurality of target-specific counters on the initiator device, where one each of the plurality of target-specific counters is associated with one each of the plurality of target devices on the data bus, and an initiator-specific counter selected from a plurality of initiator-specific counters on the target device, where one each of the plurality of initiator-specific counters is associated with one each of the plurality of initiator devices on the data bus, with a common counter value,
    with the initiator device,
        writing the counter value of the target-specific counter on the initiator device into a tag field of a header for the packet, and
        writing an identifier of the initiator device into the packet header,
    sending the packet from the initiator device to the target device on the PCIe data bus,
    upon receipt of the packet by the target device, reading the identifier and checking the counter value written into the header of the packet with the initiator-specific counter on the target device,
    when the counter value written into the header of the packet is not equal to the initiator-specific counter on the target device, then generating an error message with the target device,
    posting an additional memory write with specific data to the target, posting a memory read of additional memory write location from the initiator device to the target device,
    continuing operation of the initiator device when a completion is returned with a good status and data matching the additional memory write data from the target device to the initiator device, and
    halting operation of the initiator device when the completion is returned with at least one of an error status and data not matching the memory write data from the target device to the initiator device.

* * * * *